United States Patent
Geradts

(10) Patent No.: US 8,863,703 B2
(45) Date of Patent: Oct. 21, 2014

(54) PREHEATING OF AN INTERNAL COMBUSTION ENGINE

(75) Inventor: Karlheinz Geradts, Staufen AG (CH)

(73) Assignee: Bombardier Transportation GmbH, Berlin (DE)

( * ) Notice: Subject to any disclaimer, the term of this patent is extended or adjusted under 35 U.S.C. 154(b) by 30 days.

(21) Appl. No.: 13/515,946

(22) PCT Filed: Dec. 16, 2010

(86) PCT No.: PCT/EP2010/007807
§ 371 (c)(1),
(2), (4) Date: Jun. 14, 2012

(87) PCT Pub. No.: WO2011/072880
PCT Pub. Date: Jun. 23, 2011

(65) Prior Publication Data
US 2012/0247722 A1  Oct. 4, 2012

(30) Foreign Application Priority Data
Dec. 18, 2009 (DE) .......................... 10 2009 059 090

(51) Int. Cl.
*F01P 11/00* (2006.01)
*F28F 27/00* (2006.01)
(Continued)

(52) U.S. Cl.
CPC ................. *F01P 11/20* (2013.01); *F28F 27/00* (2013.01); *F28D 20/02* (2013.01); *F01P 3/20* (2013.01); *F28D 11/02* (2013.01); *F28D 15/00* (2013.01); *B04B 5/005* (2013.01); *F01P 11/02* (2013.01); *F01P 2011/205* (2013.01); *F28F 13/00* (2013.01); *F01P 11/04* (2013.01); *Y02E 60/145* (2013.01); *F01P 11/06* (2013.01)
USPC ....................................................... 123/41.55

(58) Field of Classification Search
CPC ............. F01P 3/20; F01P 11/02; F01P 11/04; F01P 11/06; B04B 5/005
USPC ....................................................... 123/41.55
See application file for complete search history.

(56) References Cited

U.S. PATENT DOCUMENTS 2,562,812 A * 7/1951 Ogorzaly .......................... 62/641
4,286,650 A * 9/1981 Lindner .................... 165/104.13
(Continued)

FOREIGN PATENT DOCUMENTS

DE   30 35 386 A1   4/1982
DE   37 25 163 A1   2/1989
(Continued)

*Primary Examiner* — Lindsay Low
*Assistant Examiner* — Charles Brauch
(74) *Attorney, Agent, or Firm* — The Webb Law Firm

(57) ABSTRACT

An assembly comprising a coolant circuit for an internal combustion engine, wherein the internal combustion engine can be thermally coupled to at least one coolant circuit through which is flowing a coolant with a maximum permissible coolant temperature. The coolant circuit is or is capable of being temporarily thermally coupled via at least one heat exchanger to a latent heat accumulator. The latent heat accumulator has a latent heat accumulator medium with a phase transition temperature that is higher than the maximum permissible coolant temperature. The latent heat accumulator medium is disposed in a vessel of the latent heat accumulator. The vessel is displaceable relative to the at least one heat exchanger. The vessel and the heat exchanger can be brought into at least two different relative positions in which the transfer of heat from the latent heat accumulator medium to the coolant in the coolant circuit varies.

13 Claims, 8 Drawing Sheets

(51) Int. Cl.
   *F28D 20/02*   (2006.01)
   *F28D 11/02*   (2006.01)
   *F28D 15/00*   (2006.01)
   *F01P 11/20*   (2006.01)
   *F28F 13/00*   (2006.01)
   *F01P 3/20*    (2006.01)
   *B04B 5/00*    (2006.01)
   *F01P 11/02*   (2006.01)
   *F01P 11/04*   (2006.01)
   *F01P 11/06*   (2006.01)

(56) References Cited

U.S. PATENT DOCUMENTS

| 4,977,952 | A | | 12/1990 | Schatz | |
|---|---|---|---|---|---|
| 5,407,130 | A | * | 4/1995 | Uyeki et al. | 237/12.3 B |
| 5,853,045 | A | * | 12/1998 | Patry et al. | 165/10 |
| 6,945,207 | B2 | * | 9/2005 | Biess et al. | 123/142.5 R |
| 2005/0178537 | A1 | * | 8/2005 | Horn et al. | 165/202 |

FOREIGN PATENT DOCUMENTS

| DE | 197 49 793 A1 | | 5/1999 |
|---|---|---|---|
| DE | 20 2007 013 139 U1 | | 2/2009 |
| EP | 1 861 595 B1 | | 8/2008 |
| GB | 2 084 311 A | | 4/1982 |
| GB | 2114720 A | * | 8/1983 |
| JP | 2007-309570 A | | 11/2007 |
| JP | 2010-144574 A | | 7/2010 |
| JP | 2010-175048 A | | 8/2010 |

* cited by examiner

PREHEATING OF AN INTERNAL COMBUSTION ENGINE

BACKGROUND OF THE INVENTION

1. Field of the Invention

The invention relates to an assembly with a coolant circuit for an internal combustion engine, wherein the internal combustion engine can be thermally coupled to at least one coolant circuit. The internal combustion engine can especially be the drive motor of a vehicle such as a railroad vehicle. In this case the internal combustion engine provides traction to the vehicle. The internal combustion engine is thermally coupled to at least one coolant circuit, which is in turn thermally coupled or at least capable of being temporarily thermally coupled to a latent heat accumulator via at least one heat exchanger. The invention particularly relates to the field of railroad vehicles, in which much more powerful internal combustion engines are typically used than in road vehicles. The railroad vehicle can in particular be a locomotive, e.g., a diesel-electric locomotive. Using the preheating for other vehicles such as ships, however, is also conceivable. The invention further relates to a method of preheating the internal combustion engine.

2. Description of Prior Art

To avoid a cold start of an internal combustion engine, the engine is usually preheated via the coolant circuit of the engine. To this end, use is made of preheating devices that usually generate heat for heating the coolant in the coolant circuit by burning the same fuel that is also used to operate the internal combustion engine. The heat is delivered to the internal combustion engine by circulation of the heated coolant. The use of preheaters leads to additional fuel consumption and additional exhaust emissions.

Another option for preheating the coolant consists in the use of latent heat accumulators. For example, the use of paraffin or saline solution accumulators is known for road vehicles. The latent heat accumulator medium paraffin has a temperature of ca. 100° C. with the accumulator in the fully charged state.

Such latent heat accumulators require a large construction volume in order to store the heat needed for the preheating. The weight of such accumulators is also considerable. A further disadvantage resides in the fact that the accumulators discharge very slowly, in other words the preheating process takes a considerable amount of time. The latent heat accumulator medium paraffin in particular has a low thermal conductivity. High-performance internal combustion engines therefore cannot be heated in a reasonable amount of time with prior art latent heat accumulators with reasonable construction volumes and weights.

SUMMARY OF THE INVENTION

An object of the present invention consists in proposing an assembly with a coolant circuit for an internal combustion engine and a preheater, which can be preheated quickly with the smallest possible construction volume for the preheater and with the least possible and most efficient use of energy. A further object of the present invention consists in proposing a method for preheating an internal combustion engine.

A first fundamental idea of the present invention consists in the use of a latent heat accumulator medium that has the highest possible phase transition temperature, which is greater than the maximum permissible coolant temperature. Preference is given to a phase transition temperature of at least 100 K above the maximum permissible coolant temperature, i.e., distinctly higher. For instance, the maximum permissible coolant temperature is 100° C. for water and 200° C. for oil. Depending on the coolant, a latent heat accumulator medium having a phase transition temperature greater than 200° C. or greater than 300° C. is therefore chosen. Particular preference is given to aluminum as a latent heat accumulator medium, which, at normal ambient pressure for the phase transition from solid to liquid has a phase transition temperature of ca. 660° C. Because aluminum is a very good heat conductor, particularly in the liquid state but also in the solid state, it is well-suited as an accumulator medium. To a somewhat lesser extent this is also true for other metals that may be used alternatively or in addition to aluminum as latent heat storage media. The high thermal conductivity of metals enables especially fast charging and an especially fast discharging of the accumulator. The temperature of the accumulator medium inside the accumulator is also very uniform, i.e., only very minor temperature differences occur in the accumulator.

The use of accumulator media suitable for high temperatures and the operation of the latent heat accumulator at such high temperatures leads to considerably higher energy storage densities than with conventional low temperature heat accumulators. The consequences thereof are a smaller construction volume and a lighter weight for the latent heat accumulator. Especially in railroad vehicles, there is typically a considerable amount of braking power available for charging the latent heat accumulator. During the braking of the railroad vehicle, the braking energy is obtained by the drive motors operating in the generator mode and can be used for charging via electric heating resistors, for example, which are disposed inside the latent heat accumulator. Electric drive motors are also typically used nowadays in railroad vehicles that are also equipped with an internal combustion engine for providing traction. The internal combustion engine customarily powers an electric generator, and the electric power produced by the generator is used for operating the drive motors.

A second fundamental idea of the present invention consists in the ability to control the transfer of heat from the accumulator medium of a latent heat accumulator to the coolant in the coolant circuit. For a similarly charged latent heat accumulator, better heat transfer means a greater heat flux and vice versa. The ability to control the heat transfer enables the use of other latent heat accumulator media, particularly materials that exhibit an accumulator-relevant phase transition (e.g., from solid to liquid) at higher temperatures than those known in prior art accumulators such as paraffin accumulators. But also in latent heat accumulators with accumulator media known per se, the ability to control the heat transfer has the advantage that greater heat fluxes are possible if the accumulator is suitably constructed, e.g., comprises a larger surface area over which the heat transfer takes place. By controlling the heat transfer, the heat being transferred to the coolant can be reduced when preheating is not needed. Given uniform temperature conditions with non-uniform heat transfer, the heat transfer corresponds to the heat transferred per unit of time, i.e., to the thermal output. However, since different temperature conditions generally prevail in different latent heat accumulators with different accumulator media, the heat transfer in the sense of this description corresponds to an effective total heat transfer coefficient of the materials involved in the heat transfer.

Particularly for controlling the heat transfer, it is proposed that a vessel of the latent heat accumulator containing the latent heat accumulator medium be moved relative to the coolant circuit such that the heat transfer surface and consequently the heat transfer are altered due to the different relative positions of the vessel and the coolant circuit. Heat transfer surface is understood to mean a surface perpendicular to the flow direction of the heat, via which heat is transferred from the heat accumulator medium to the coolant. By the movement of the vessel and the coolant circuit relative to one another, the size of this heat transfer surface is altered. If materials with different thermal conductivity properties (i.e., good heat insulators and good heat conductors) are present in the area of the outer surface of the accumulator, as is the case in a preferred embodiment, then only the portion of the outer surface comprising the good heat conducting materials is designated as the heat transfer surface. A small portion of heat is also transferred to the coolant via the good heat insulating materials. This portion, however, is negligible.

The vessel can be moved to adjust the heat transfer surface. However, it is alternatively or additionally possible to move a portion of the coolant circuit and/or a heat exchanger or part of a heat exchanger in order to transfer the heat from the latent heat accumulator medium to the coolant. If at least one heat-insulating material between the coolant circuit and the latent heat accumulator medium is also moved, this material can be considered as part of the heat exchanger. If the heat insulating material is in a position where it prevents the transfer of heat, the heat exchanger exhibits poor thermal conductivity. Especially by gradually moving the heat-insulating material away, thermal conductivity is improved such that a preheating of the coolant can occur.

For adjusting the heat transfer surface, however, preference is given to moving the vessel containing the latent heat accumulator medium.

The combination of both of the aforementioned fundamental ideas of the invention leads to the fact that energy storage devices with higher storage density can be used on the one hand, and that the energy stored at the higher temperatures (sensible heat and latent heat) can be stored for long periods on the other. Because the transfer of heat from the latent heat accumulator to the coolant is controllable, heat transfer can be set to a lower value during periods in which preheating is not required. When preheating is required, however, the heat transfer is set to a higher value. If heat transfer can be set to a very low value, there will still be stored heat available for preheating the vehicle after long idle periods, for example. Owing to the high energy storage density, during idle periods at least a small amount of heat can be extracted and used, for example, for freeze protection.

The essential advantages of the invention can be summarized as follows: Additional fuel for operating a fuel combustion-based preheater device can be saved. There are no toxic emissions due to combustion products from the preheater. Because the phase transitions occur at high temperatures the energy storage density is very high, since much more sensible heat is also stored. The accumulator weighs much less. By controlling the heat transfer, the accumulator discharge can be set to very low values. For this reason in particular it is possible to dispense with a separate, fuel-consuming preheater device. Very high heat fluxes can be generated during the preheating, particularly when metals (preferably aluminum) are used as accumulator media. Thus very little time is needed for preheating the internal combustion engine.

The following in particular is proposed: An assembly with an internal combustion engine, wherein the internal combustion engine is thermally coupled to at least one coolant circuit through which flows a coolant with a maximum permissible coolant temperature, the coolant circuit is thermally coupled or at least capable of being temporarily thermally coupled via at least one heat exchanger to a latent heat accumulator, the latent heat accumulator comprises a latent heat accumulator medium having a phase transition temperature that is higher than the maximum permissible coolant temperature, preferably more than 600 °C., the latent heat accumulator medium is disposed in a vessel of the latent heat accumulator, the vessel is movable relative to the at least one heat exchanger, the vessel and the heat exchanger can be moved into at least two different relative positions in which the transfer of heat from the latent heat accumulator medium to the coolant in the coolant circuit varies.

Because the internal combustion engine can be any kind of internal combustion engine, the latter is merely an optional additional component of the assembly according to the present invention.

Also proposed is a method for preheating an internal combustion engine, wherein before being started, the internal combustion engine is heated by the heating of coolant in at least one coolant circuit through which flows a coolant with a maximum permissible coolant temperature, the coolant in the coolant circuit is heated with heat from a latent heat accumulator, the latent heat accumulator has, in a vessel, a latent heat accumulator medium that yields heat to the coolant at a phase transition temperature that is higher than the maximum permissible coolant temperature, preferably more than 600° C., for controlling the intensity of the heat flux from the latent heat accumulator medium to the coolant, the vessel is moved relative to the coolant circuit such that the heat transfer is altered because the vessel and the coolant circuit are in different relative positions.

At least two different relative positions of the vessel and the heat exchanger are possible with the proposed method. If only two relative positions can be set, preference is given to one of the relative positions corresponding to a state of the accumulator in which a preheating takes place if the latter is charged. The other relative position corresponds to a state in which the latent heat accumulator is insulated against heat losses as effectively as possible. However, preference is given to the relative position of the vessel and of the heat exchanger being continuously adjustable so that the heat transfer is continuously settable to any value within a range of values between the least possible and greatest possible heat transfer. This enables a control device for controlling the preheating to ensure an optimum preheating process. For instance, maximum possible heat transfer can take place at the start of the preheating process. As soon as the coolant has warmed up to operating temperature, the heat transfer can be set to a lower value, for example, one that corresponds to an almost static state in which the coolant absorbs only as much heat from the latent heat accumulator as it yields to the internal combustion engine. As the temperature of the internal combustion engine increases during the preheating, the heat transfer can be continuously reduced. However, other processes with other heat transfer time sequences are also possible.

Water or oil is typically used as a coolant. Especially when using water or a water-antifreeze mixture as a coolant, it is important to ensure that the coolant does not vaporize, i.e., that the boiling temperature is not exceeded. There is no danger of this occurring in conventional low-temperature latent heat accumulators that are operated at accumulator temperatures of around 100° C. With the high-temperature latent heat accumulator of the invention, however, in principle such a coolant can vaporize. Owing to the controllability of the heat transfer, coolant vaporization is preventable.

In a concrete embodiment of the latent heat accumulator, a wall of the vessel containing the heat accumulator medium has at least one first area with relatively high thermal conductivity and at least one second area with relatively low thermal conductivity. The wall of the vessel is surrounded by an outer shell of the latent heat accumulator, which is preferably capable of mechanically contacting at least the first area with high thermal conductivity. The outer shell comprises a first zone for transferring heat to the coolant and further comprises at least one second zone that insulates the vessel from heat losses. At least two different relative positions of the vessel and its surroundings, i.e., the wall of the vessel and the shell, can be set. In a first relative position a heat flux flows via the first area of the vessel wall, which has high thermal conductivity, and via the first zone of the shell from the latent heat accumulator medium to the coolant. To this end, especially the at least one first area is in full contact with the first zone of the shell. In a second relative position of the vessel and its surroundings, a weaker heat flux flows via the first zone from the latent heat accumulator medium to the coolant. This heat flux in particular is so weak that it corresponds to the heat losses of the accumulator with the best possible insulation, i.e., the minimum possible heat transfer.

When mention is made of a shell of the latent heat accumulator in this description, this does not mean that the shell must consist of a single material, or that the shell must have a more or less uniform overall thickness like the peel of an orange. In fact preference is given to the shell consisting of zones of high thermal conductivity and zones of low conductivity. The zones of low conductivity are preferably formed from material with good thermal insulation properties and/or by a hollow space, which can contain a vacuum in a special embodiment. The vessel wall can also consist of different materials and, in the second area with low thermal conductivity, can have hollow spaces or at least one hollow space that is evacuated.

Graphite is a suitable material with high thermal conductivity. Preference is given to using graphite for the first area of the vessel wall with relatively high thermal conductivity as well as for the first zone of the shell for transferring the heat to the coolant. Graphite is especially suited for temperatures around and above the phase transition point of aluminum (660° C.).

Examples of suitable thermal insulation materials include air, inert gas (e.g., nitrogen), and low pressure gas (vacuum).

In a special embodiment of the latent heat accumulator with vessel wall areas of varying thermal conductivity and different shell zones, the at least two different relative positions of the vessel and its surroundings can be set by rotating the vessel about a rotation axis such that, in a first rotary position, a heat flux flows via the first area and the first zone from the latent heat accumulator medium to the coolant and such that, in a second rotary position, a weaker heat flux flows via the first zone from the latent heat accumulator medium to the coolant. The second rotary position is preferably the position in which the vessel is most effectively thermally insulated. As with other designs, here too preference is given to a continuously adjustable relative position. This is particularly easily achieved with the rotatable configuration of the vessel. In particular a vessel that is rotationally symmetric about the rotation axis can be turned about any angle such that a larger or smaller surface of the at least one area of the vessel wall with high thermal conductivity faces the first zone or the at least one first zone of the shell, thereby achieving varying heat outputs for heating the coolant. A concrete embodiment will be addressed in more detail in the description of the figures.

In the at least one first zone of the shell, preference is given to the presence of a heat exchanger for transferring the heat from the latent heat accumulator medium to the coolant. The material of the first zone can be part of the heat exchanger. In a concrete embodiment particular consideration is given to a block heat exchanger, in which a block of good heat conducting material forming the first zone is traversed by at least one pipe or other passage through which the coolant flows.

An advantage of the embodiment with the shell and the vessel movable in relation thereto consists in that very good thermal insulation is achievable in the second relative position. In this second relative position, the at least one first vessel wall area with relatively high thermal conductivity can come into abutment on a shell material with very good thermal insulating properties.

In an alternative embodiment of the latent heat accumulator, the vessel containing the latent heat accumulator medium is an inner vessel that is displaceably disposed inside an outer vessel, wherein a fluid is present in a partial area between the inner vessel and an outer wall of the outer vessel. As the inner vessel is moved in a first direction, the fluid is forced by the latter into at least one hollow space between the inner vessel and the outer wall of the outer vessel such that the fluid improves the heat flux to the coolant through the now at least partially filled hollow space. As the inner vessel is moved in a second direction opposite the first direction, the fluid is able to flow back into the zone that it was forced out of. Therefore preference is given to the first direction in which the inner vessel is moved being a downward direction and to the fluid being present underneath the inner vessel. As it moves, the inner vessel thus exerts pressure on the fluid from above and partially forces it into the hollow space or the hollow spaces between the inner vessel and the outer wall of the outer vessel.

The fluid is a material that is liquid at the normal operating temperature of the latent heat accumulator. When the accumulator is completely discharged, however, the material can also be solid. Examples of a suitable material include tin or another metal possessing a lower melting point in comparison to the latent heat accumulator medium in the vessel. Especially if the actual latent heat accumulator medium in the inner vessel is aluminum, tin is suitable as a fluid in the interspace between the inner vessel and the outer wall of the outer vessel.

In this configuration of the latent heat accumulator the coolant is preferably conveyed directly outside the outer wall of the outer vessel when it is to be heated during the preheating, wherein coolant circuit pipes, for example, are in mechanical contact with the outer wall and preferably coiled several times around the outer wall. In this case the outer wall of the outer vessel and the pipes or pipe sections of the coolant circuit jointly constitute a heat exchanger for transferring heat from the latent heat accumulator medium to the coolant. However, other configurations are also possible; for instance, a plate heat exchanger or a plurality of plate heat exchangers can be used with this embodiment. In this case preference is given to a plate of the plate heat exchanger forming the outer wall of the outer vessel.

An advantage of the embodiment with fluid in the interspace between the inner vessel and the outer wall of the outer vessel consists in the fact that the fluid compensates for variations in the dimensions of parts of the accumulator induced by varying rates of thermal expansion or thermal contraction. The mobility of the inner vessel is thus not restricted or prevented by the walls of the inner and outer vessels jamming. Furthermore, a very efficient transfer of heat from the inner vessel to the coolant is achievable especially by selecting metal for the fluid in the interspace, especially since the fluid adapts itself very well to the shape of the surface of the inside of the outer wall of the outer vessel and of the outside of the outer wall of the inner vessel. The heat transport within a metallic fluid in particular is also very efficient. Furthermore, the heat transfer is readily continuously settable because different-sized areas of the hollow space or hollow spaces between the inner vessel and the outer wall of the outer vessel are filled with the fluid due to the latter being forced from the reservoir in which it is present except during preheating periods. Furthermore, there is exceptionally little wear on the accumulator parts involved due to the movement of the inner vessel because the fluid does not cause any wear. However, wear is in principle possible when mechanical parts rub against one another during a movement. Also, the entire outer circumference of the accumulator (i.e., the entire wall of the outer vessel surrounding the inner vessel) can serve as a heat exchanger surface.

BRIEF DESCRIPTION OF THE DRAWINGS

Illustrative embodiments of the invention will now be described with reference to the appended drawing. The individual figures of the drawing show, in diagrammatic form.

DETAILED DESCRIPTION OF THE INVENTION

Figure 1:
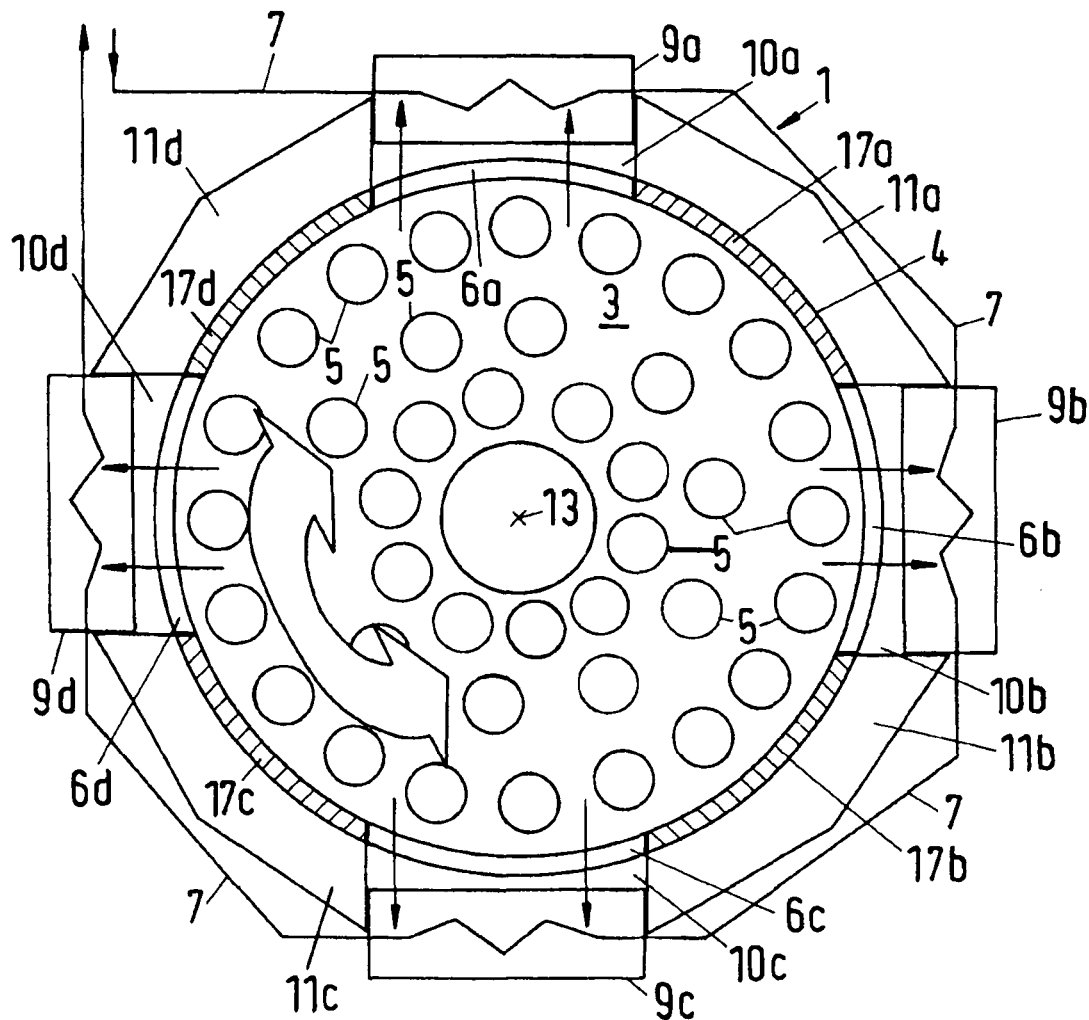
FIG. 1 a cross-section through a first embodiment of a latent heat accumulator, with the accumulator vessel in a first rotary position corresponding to the maximum settable heat transfer surface, FIG. 2 a cross-section through the latent heat accumulator shown in FIG. 1, with the accumulator vessel in a second rotary position in which the heat transfer surface is smaller than in the rotary position of FIG. 1, FIG. 3 a cross-section through the accumulator of FIG. 1 and FIG. 2, but with the accumulator vessel in a rotary position in which the heat transfer surface assumes the smallest possible settable value, FIG. 4 a longitudinal section through the accumulator illustrated in FIG. 1 through FIG. 3 in which the rotation axis of the accumulator vessel lies in the plane of the figure and in which the accumulator vessel is in the rotary position illustrated in FIG. 1, FIG. 5 a vertical cross-section through a second illustrative embodiment of a latent heat accumulator with the inner accumulator vessel in an upper position in which the heat transfer has the smallest possible settable value, FIG. 6 another vertical longitudinal section through the accumulator illustrated in FIG. 5 with the inner accumulator vessel in a lower position than the one shown in FIG. 5 and in which the floor of the inner accumulator vessel contacts a fluid present in a floor space of the outer accumulator vessel, FIG. 7 the accumulator illustrated in FIGS. 5 and 6 in a vertical longitudinal section in which the inner accumulator vessel is in an even lower position than the one shown in FIG. 6 and in which the inner accumulator vessel is immersed in the fluid-filled floor space of the outer accumulator vessel such that said fluid is forced into higher areas of an interspace between the outer wall of the inner accumulator vessel and the outer wall of the outer accumulator vessel such that the heat transfer assumes the maximum possible settable value, FIG. 8 a locomotive with a fluid-cooled internal combustion engine in which the coolant can be heated by a latent heat accumulator.
Figure 2:
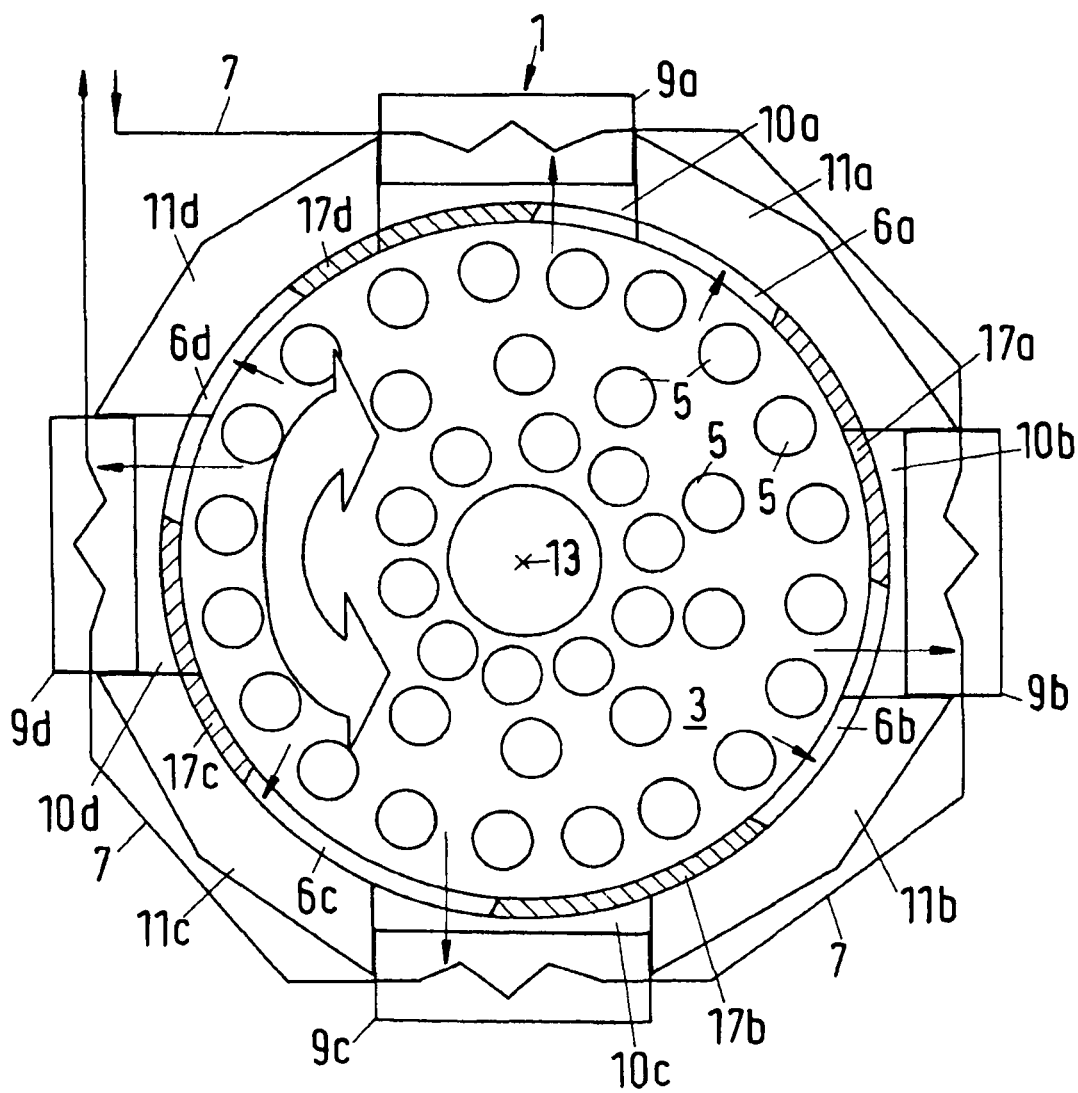
Figure 3:
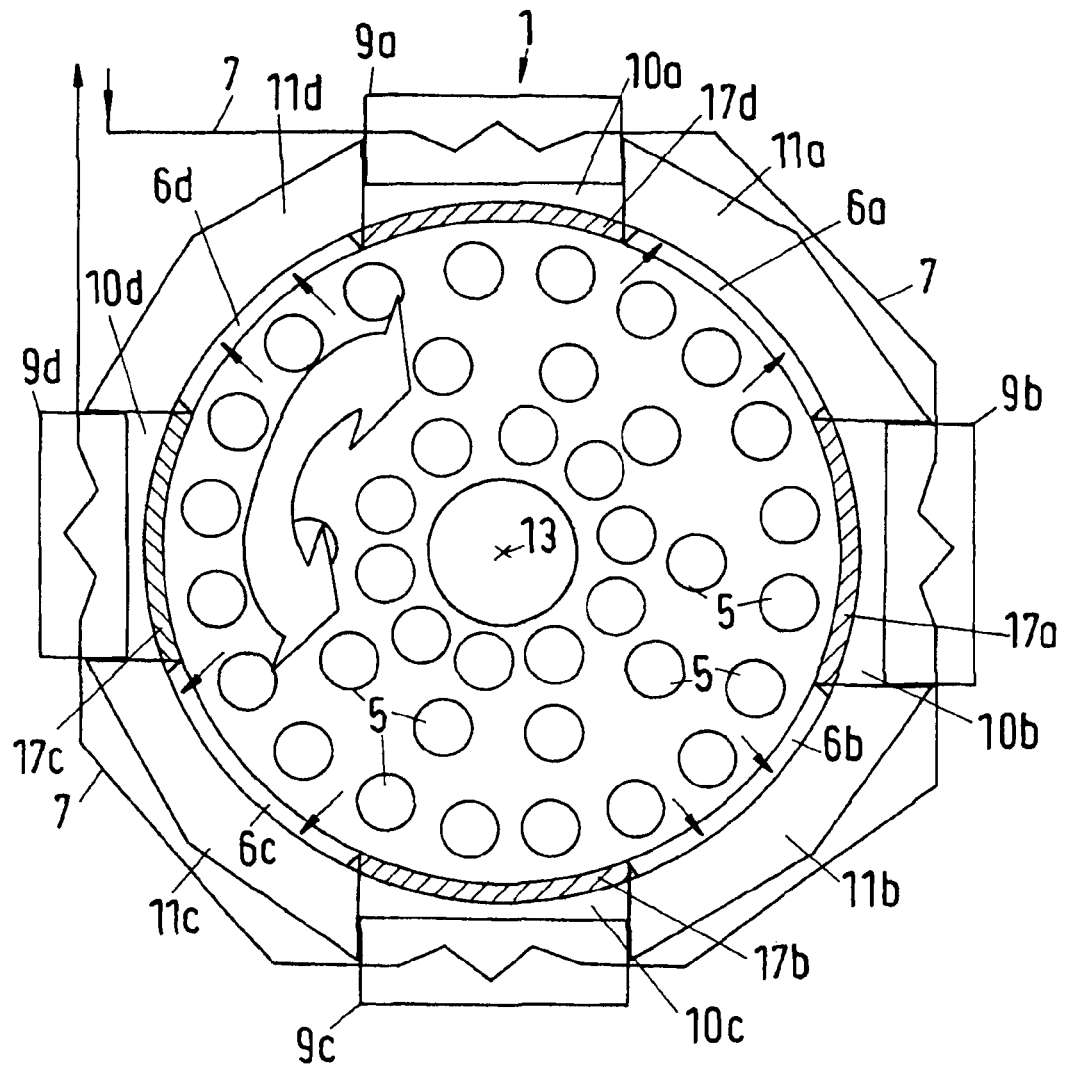
Figure 4:
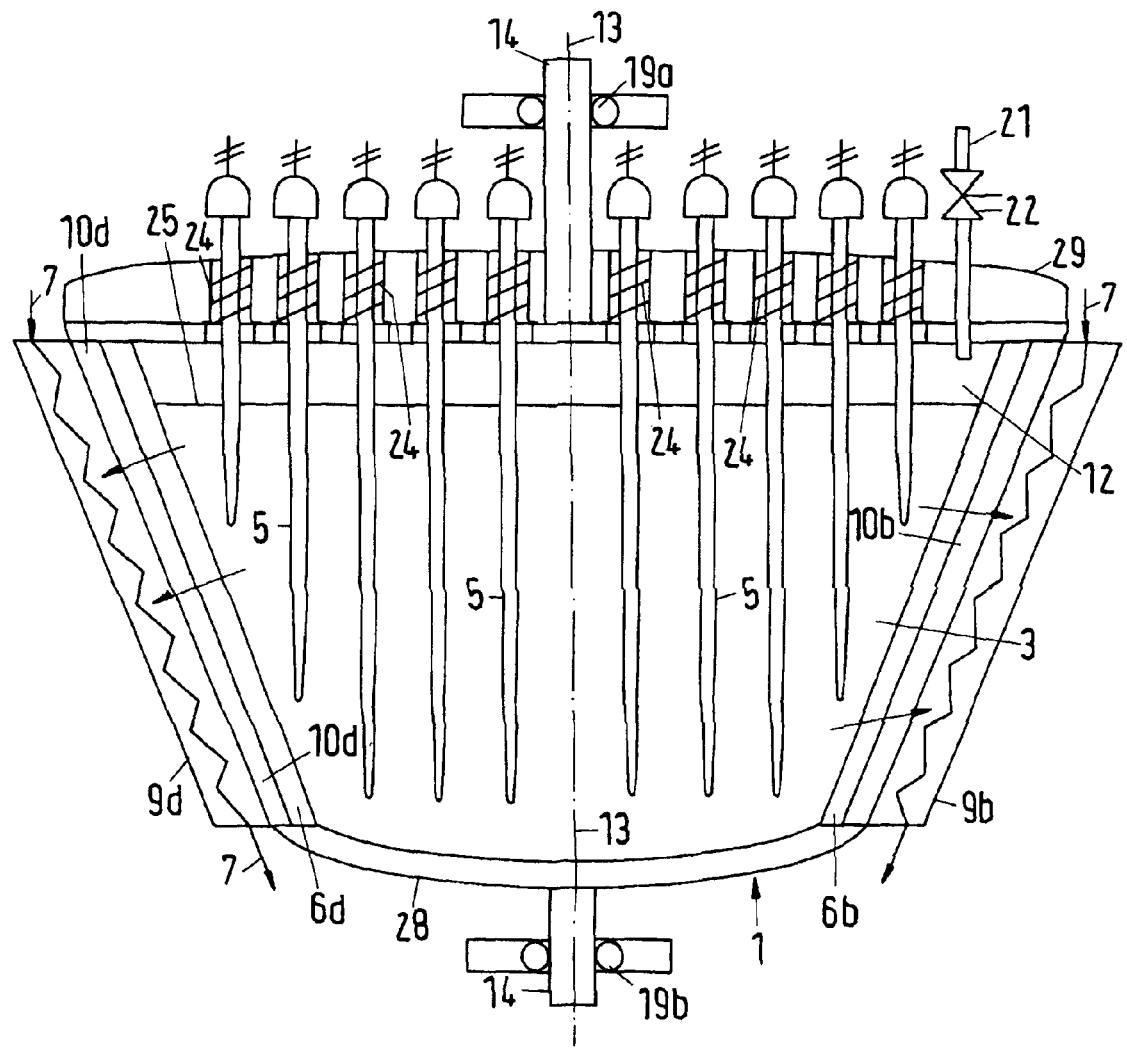

FIGS. 1 through 3 show a cross-section through a first illustrative embodiment of a latent heat accumulator. FIG. 4 shows a corresponding longitudinal section in the plane of a rotation axis 13 of the accumulator vessel. The accumulator vessel 3 has a double outer wall, the different segments of which are designated with the reference signs 6 and 17. The areas 6a, 6b, 6c, 6d are filled with a good heat conducting material such as graphite, whereas the areas 17a, 17b, 17c, 17d are equipped with a heat insulating material. The areas 17, 6 alternately change in the circumferential direction of the accumulator vessel wall. Four areas with good heat conducting material and four areas with heat insulating material are illustrated in this example of embodiment. However, provision could also be made of a different number of good heat conducting and insulating areas of the vessel wall.

Corresponding to the number of good heat conducting and insulating areas of the vessel wall, the accumulator 1 comprises an equal number of stationary areas 10 which are also composed of good heat conducting material such as graphite. Disposed radially outside each of these areas 10 is a corresponding block heat exchanger 9a, 9b, 9c, 9d through which is circulated a coolant during the preheating mode of an internal combustion engine (not illustrated in FIG. 1) such that said coolant is heated with heat from the accumulator vessel. Situated in the circumferential direction between the areas 10a, 10b, 10c, 10d composed of good heat conducting material are areas of heat insulating material 11a, 11b, 11c, 11d. Like the different areas of the accumulator vessel wall, these good heat conducting areas 10 and heat insulating areas 11 alternately change in the circumferential direction. In doing so the good heat conducting areas 6 of the accumulator vessel wall extend in the circumferential direction over the same angular range as the good heat conducting areas 10. In the rotary position illustrated in FIG. 1, these good heat conducting areas 6 of the accumulator vessel wall and the stationary good heat conducting areas 10 completely adjoin one another. The heat insulating areas 17 of the accumulator vessel wall and the stationary insulating areas 11 likewise completely adjoin one another. Preference is given to the angle ranges of the good heat conducting areas of the accumulator wall and the angle ranges of the heat insulating areas 17 of the accumulator vessel wall being equal. The reason for this is so that the greatest possible transfer surface is available for transferring heat from the interior of the accumulator to the stationary good heat conducting areas 10 (in the rotary position of the accumulator vessel 3 shown in FIG. 1) on the one hand and so that the maximum possible thermal insulation effect is achieved in the rotary position shown in FIG. 3 on the other.

As already mentioned, the accumulator vessel 3 is rotatable about the rotation axis 13, which is also its axis of rotational symmetry. Present in the interior of the accumulator vessel 3 is a plurality of heating resistors 5, which are symbolized by circles in FIG. 1 through FIG. 3. Between the heating resistors 5 is situated the latent heat accumulator material (aluminum in this illustrative embodiment). With the charged accumulator in the rotary position illustrated in FIG. 1, heat is transferred (as indicated by a total of 8 long arrows pointing radially outwards) from the latent heat accumulator medium via the good heat conducting areas 6 of the accumulator vessel wall and via the good heat conducting stationary areas 10 to the block heat exchangers 9 and thus to the coolant circulating through said heat exchangers 9. The coolant circuit is diagrammatically illustrated and designated with the reference sign 7.

Present in the interior of the area that contains the actual latent heat accumulator medium is a mechanical construction that enables the accumulator vessel to rotate. This construction can be configured in various ways, even more compactly than shown in FIG. 1. The construction will not be discussed in any more detail here.

In the rotary position illustrated in FIG. 2, which was reached by a 22.5° clockwise turn from the rotary position shown in FIG. 1, only a portion of the outer surface of the good heat conducting areas 6 of the accumulator vessel wall is facing the good heat conducting areas 10 that are not turned simultaneously. Hence a heat transport from the latent heat accumulator medium to the coolant in the heat exchanger blocks 9 can only occur via this portion of the outer surface of the good heat conducting areas 6. As a result heat transfer is reduced.

In the rotary position illustrated in FIG. 3, which was reached by an additional 22.5° clockwise turn from the rotary position shown in FIG. 2, the good heat conducting areas 6 of the accumulator vessel wall are facing the stationary heat insulating areas 11. In addition, the heat insulating areas 17 of the accumulator vessel wall are facing the good heat conducting stationary areas 10. The heat transfer is thus reduced to the minimum possible.

The stationary good and poor heat conducting areas 10, 11 jointly constitute a shell for the rotatable part of the latent heat accumulator.

FIG. 4 shows a longitudinal section through the accumulator illustrated in FIGS. 1 through 3. Two of the heat exchanger blocks 9b, 9d through which coolant fluid from the coolant circuit 7 is circulated during a preheating process can be discerned on the right- and left-hand sides of the drawing. If preheating is not occurring, the coolant fluid may still flow through the heat exchanger blocks 9 or alternatively, it may take a different route.

The accumulator vessel 3 is in the rotary position illustrated in FIG. 1, in which the good heat conducting areas 6b, 6d are radially opposite the stationary good heat conducting areas 10b, 10d.

In the illustrated longitudinal section the accumulator vessel is roughly trapezoidal in shape. Other cross-sectional shapes, however, are also possible. The accumulator vessel 3 is heat insulated on its floor 28 such that a heat transfer only occurs at the sides, circumferentially in the radial direction. On its cover 29 the accumulator vessel has a plurality of through-holes through which the heating resistors 5 are immersed in the latent heat accumulator medium. The through-holes for the heating resistors 5 are equipped with spring elements 24 that enable an upward deflection of the heating rods in order to prevent damage due to thermal expansion. The electrical connection of the heating resistors 5 is schematically symbolized in FIG. 4 by two diagonal dashes.

The accumulator vessel 3 is rotatable about the pivot axis 13 that extends along the rotation axis of a shaft 14 through middle of the accumulator vessel. The shaft 14 can pass through the accumulator vessel from top to bottom (other than as illustrated in FIG. 4) or it can be interrupted (as illustrated in FIG. 4) and only engage at the top and bottom of the accumulator vessel. In the illustrative embodiment, the shaft 14 is rotatably mounted by a top 19a and a bottom 19b bearing.

The upper area inside the accumulator vessel 3 is not filled with the latent heat accumulator medium. Instead there is a space filled with inert gas above the fluid level 25 of the latent heat accumulator medium or above the surface of the solidified latent heat accumulator medium. This space can be filled and emptied by a gas line 21 equipped with a cut-off valve 22. This gas-filled space allows changes in volume to take place in response to changes in the physical state of the latent heat accumulator medium. In addition the inert gas-filled space insulates the latent heat accumulator medium up to the cover 29.

Figure 5:
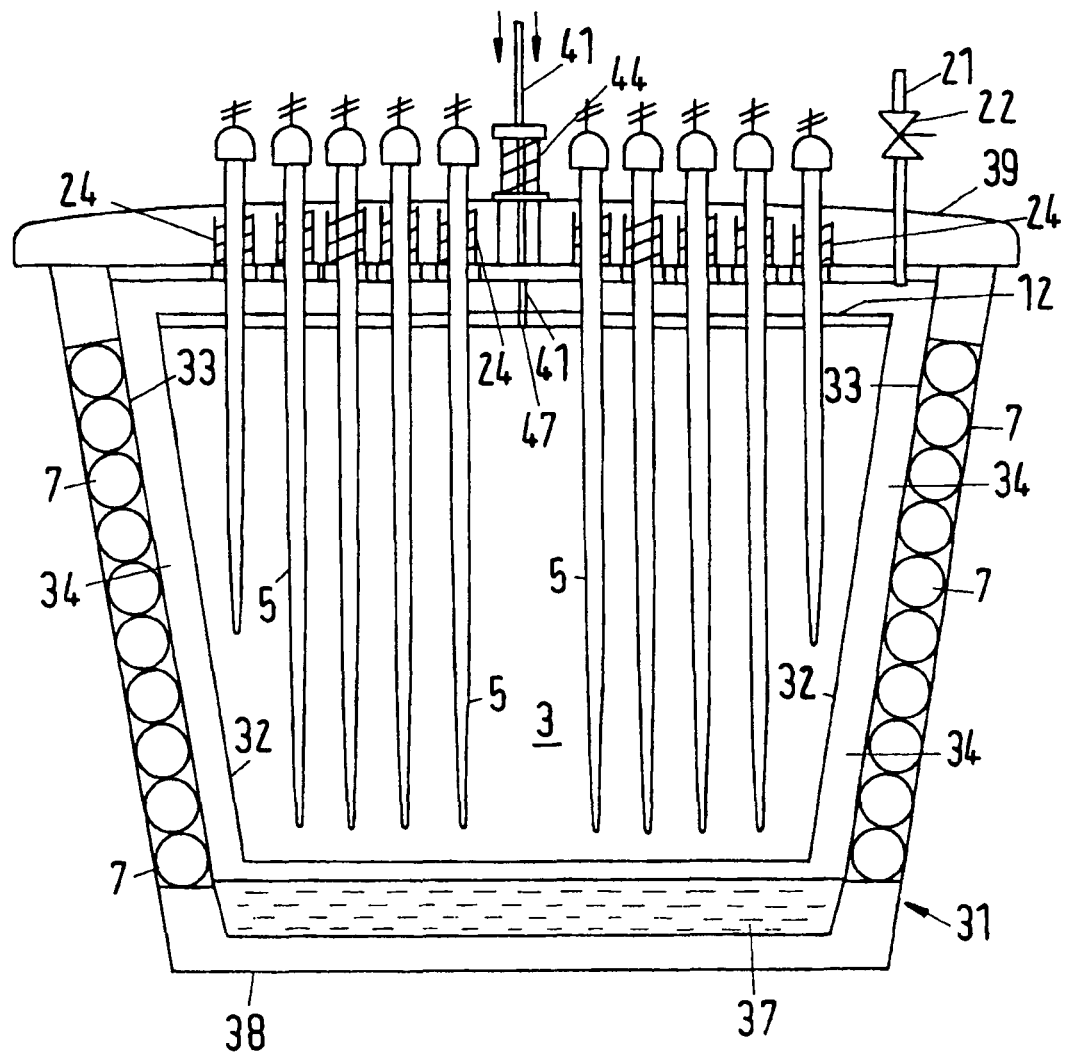
Figure 6:
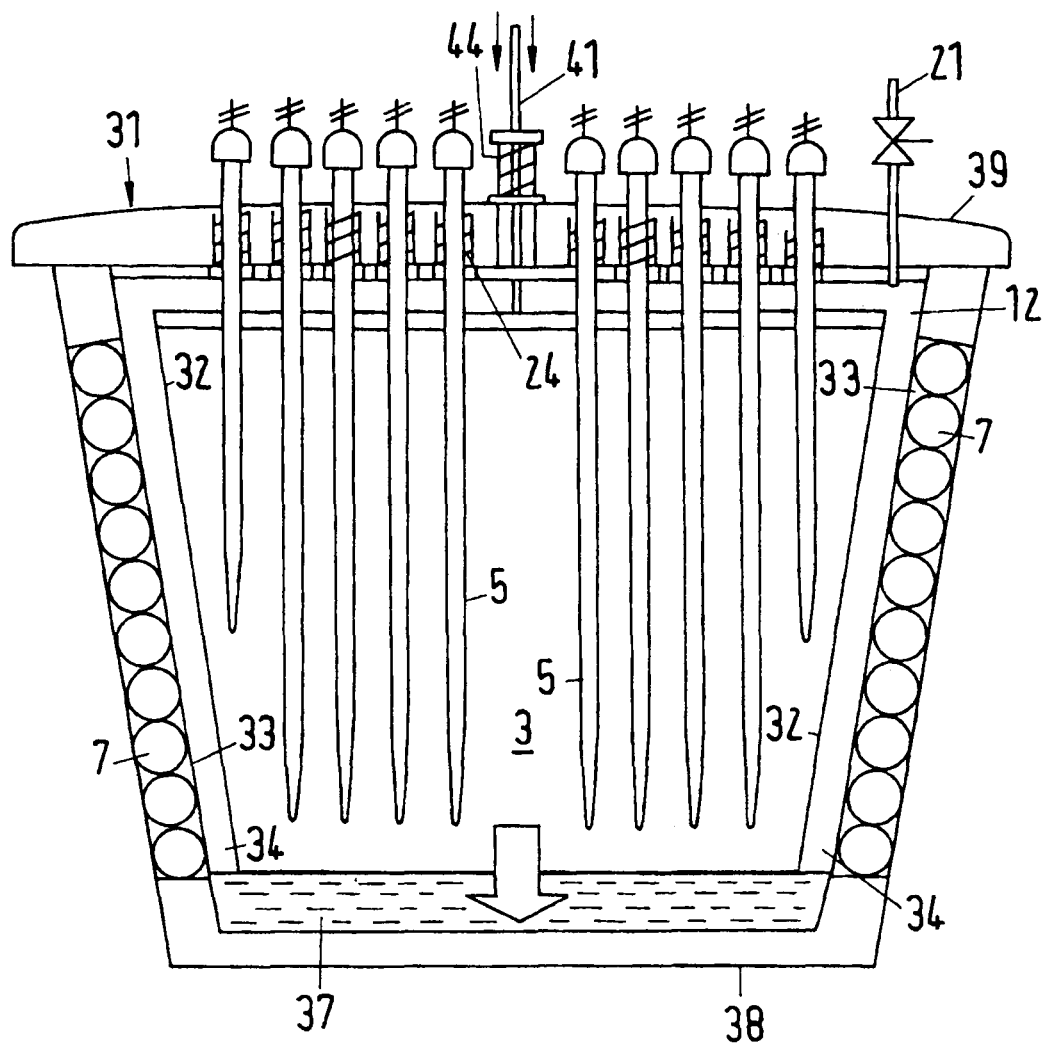
Figure 7:
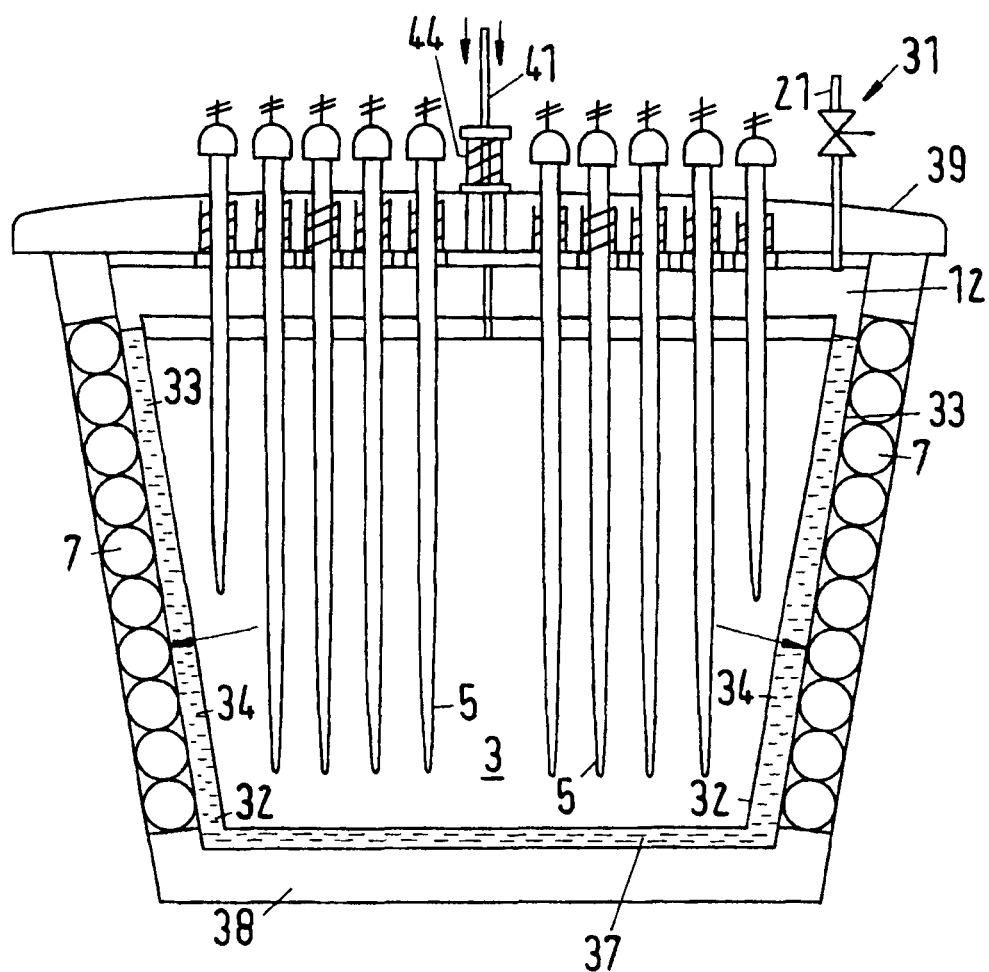

In the second illustrative embodiment 31 of a latent heat accumulator shown in FIGS. 5 through 7, several coils of the coolant circuit 7 extend around the inner vessel 3, which is circular in cross-section in this illustrative embodiment. Several heating resistors 5 are also present in the inner vessel 3, the outer circumference of which is delimited by the outer wall 32 and the floor. In general it is not compulsory to charge the high temperature latent heat accumulator with heating resistors and other possibilities are conceivable, for example inductive charging by electromagnetic fields, which are generated by a primary coil or a primary coil array disposed outside the accumulator vessel and which induce, in a secondary coil or secondary coil array inside the accumulator vessel, an AC voltage which in turn gives rise to an AC current that heats the latent heat accumulator medium. If the latent heat accumulator medium is electrically conductive, it is also possible to dispense with the secondary coil. The electromagnetic fields inductively generate eddy currents in the electrically conductive material, which in turn result in the input of heat into the accumulator medium.

The inner vessel 3 in FIGS. 5 through 7 is surrounded by an inner wall 33 of the outer vessel, wherein an interspace 34 is present between the inner wall 33 of the outer vessel and the outer wall 32 of the inner vessel 3. In the state illustrated in FIGS. 5 through 7, this interspace in the plane of the figure is free of fluid and only filled with inert gas. The inert gas can be nitrogen, for example.

The vertical cross-section of the accumulator illustrated in FIG. 5 shows the inner vessel 3 in an upper position in which its floor is not immersed in the fluid in the floor area 37 of the outer vessel. The plurality of coils of the coolant circuit 7 encircling the outer circumference of the outer vessel can be readily discerned in FIG. 5 through FIG. 7. In the state illustrated in FIG. 5, no fluid is present in the interspace 34 between the outer wall 32 of the inner vessel 3 and the inner wall 33 of the outer vessel because the floor of the inner vessel is not immersed in the fluid in the floor area 37. Thus the transfer of heat between the latent heat accumulator medium inside the inner vessel 3 and the fluid in the coolant circuit 7 is as little as possible in the accumulator 31.

As indicated by two short downwardly pointing arrows at the top of FIG. 5, the inner vessel 3 is downwardly displaceable. To this end, provision is made of a rod 41 that acts on the inner vessel 3 via a punch 47. No further details of the mechanical construction are shown here.

As in the illustrative embodiment of FIGS. 1 through 4, the heating resistors 5 are spring-loaded. Further provision is also made of a gas connector 21 with a cut-off valve 22 for filling the interspace 34 and the space between the latent heat accumulator medium and the cover 39 of the accumulator 31 with pressurized inert gas.

FIG. 6 shows a vertical longitudinal section similar to the one in FIG. 5, but in which the inner vessel 3 has been downwardly displaced such that its floor is in contact with the surface of the fluid in the floor space 37 of the outer vessel. This fluid is tin, for example. The latent heat accumulator medium is aluminum, for example. In the state illustrated in FIG. 6 with the accumulator charged, a transfer of heat to the fluid in the floor space 37 is taking place. Although the fluid has not yet been forced into the interspace 34 at the outer circumference of the inner vessel 3, nevertheless a slight transfer of heat from the latent heat accumulator medium to the coolant in the coolant circuit 7 is already taking place via the fluid in the floor space 37 and the outer wall 33 of the outer vessel. The heat transfer surface has already been increased.

By further downward movement of the inner vessel 3, the heat transfer surface can now be continuously increased to its maximum value. The maximum value state is illustrated in FIG. 7. The inner vessel 3 is in its lowest possible position. The fluid, all of which was collected in the floor space 37 of the outer vessel in the relative position illustrated in FIG. 5, has now been forced into the interspace 34 between the outer walls 32, 33 by the downward movement of the inner vessel 3. The fluid in the interspace 34 has reached the maximum permissible peak level, wherein the outer circumference of the inner vessel 3 or the entire height thereof is in contact with the fluid such that a transfer of heat to the coils of the coolant circuit 7 and to the coolant circulating therein can take place over the entire height.

The spring 44 illustrated at the top of FIG. 5 through FIG. 7 ensures that the heat transfer between the inner and outer vessels is interrupted after the downwardly directed force is no longer being exerted on the rod 41; in other words, after cessation of the force the inner vessel 3 is pushed upwards and there is no longer any direct contact between the inner vessel 3 and the fluid in the floor space 37. The spring 44 therefore serves as a safety mechanism for the assembly.

Figure 8:
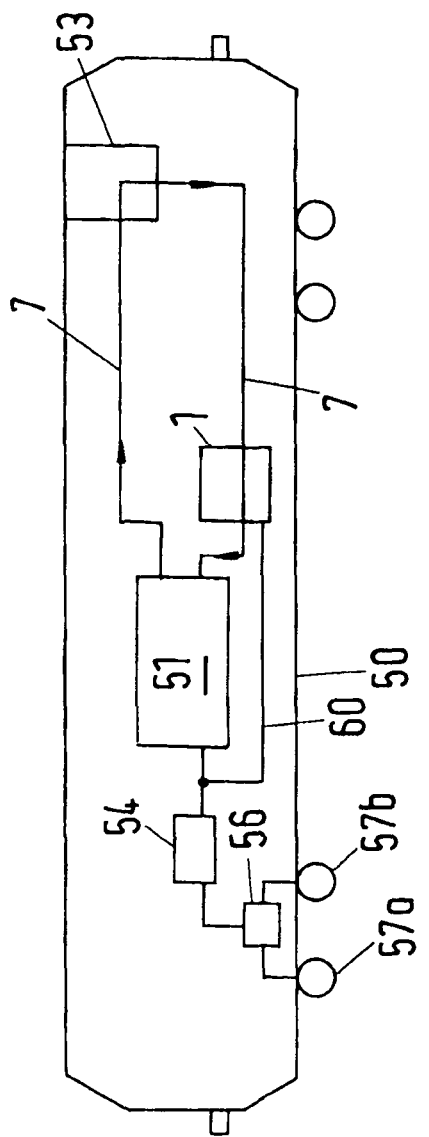

FIG. 8 shows a locomotive 50, which is driven by an internal combustion engine 51. The internal combustion engine 51 is coupled to a generator, which when the internal combustion engine is in operation generates electric current that is conducted to the drive motors 56 via the electric motor control 54. The drive motors 56 drive the wheels 57a, 57b. When the locomotive 50 is braked, the drive motors 56 are mechanically driven by the wheels 57 and, in the generator mode, generate electric current, which is fed via the electric motor control 54 via the electric conduit 60 to the heating resistors or to another heating device (not shown in any detail in FIG. 8) of a latent heat accumulator 1. The latent heat accumulator 1 can be, for example, the accumulator illustrated in FIGS. 1 through 4, the accumulator illustrated in FIGS. 5 through 7, or another accumulator.

While in operation the internal combustion engine 51 is cooled by the coolant circuit 7, and the coolant circuit 7 is cooled by a fluid/air heat exchanger 53.

Before the internal combustion engine 51 is started, it is preheated by the coolant circulating in the coolant circuit 7. To this end, the coolant flows (as described above, for example) through the latent heat accumulator 1 and takes up heat stored therein.

An example for charging and discharging the latent heat accumulator, e.g., the latent heat accumulator described in FIGS. 1 through 4 or in FIGS. 5 through 7, is described in the following. When initially charging the aluminum used as a latent heat accumulator medium in this embodiment, at first sensible heat is stored, i.e., the temperature of the aluminum steadily increases in relation to heat input. As soon as the phase transition temperature of ca. 660° C. is reached, however, the aluminum starts to melt. No further substantial temperature increases (slight local ones at the most) take place until all of the aluminum present in the latent heat accumulator has melted. If the accumulator is further charged with heat, the temperature of the liquid aluminum increases. At a temperature of 750° C., for example, the accumulator has been heated to its maximum temperature and is thus fully charged.

When discharging the accumulator, the sensible heat in the 750° C. to 660° C. temperature range is extracted first. If the accumulator is further discharged, the reverse phase transition from the liquid to the solid physical state occurs. The accumulator can then be further discharged by extracting sensible heat again.

A high temperature aluminum latent heat accumulator for a railroad vehicle, e.g., a locomotive, has a storage volume of, say, 100 l aluminum. This roughly corresponds to 270 kg. By heating up to 750° C., it is thus possible to store 30 kWh of latent heat in the manner described previously. In addition there is 45 kWh of sensible heat, which can be stored and extracted in the temperature ranges below and above the phase transition temperature of 660° C.

In the accumulator with the inner vessel and the outer vessel described in FIGS. 5 through 7, in which a heat transfer medium is present outside the inner vessel but inside the outer vessel, the procedure can be as follows. This heat transfer medium is tin, for example. As the accumulator is being charged, the inner vessel can be, for example, in the relative position to the outer wall of the outer vessel shown in FIG. 5. At first only the latent heat accumulator medium in the inner vessel heats up. The still solid tin will also heat up due to thermal radiation. To discharge the latent heat accumulator, the inner vessel is brought into the position illustrated in FIG. 6 such that the tin liquefies completely because it has a substantially lower melting point than the aluminum in the inner vessel heated up to or above its phase transition temperature.

During further operation, the tin will not resolidify until the latent heat accumulator medium in the inner vessel also reaches relatively low temperatures of around 200-300° C.

The invention claimed is:

1. An assembly comprising a coolant circuit for an internal combustion engine, wherein
the internal combustion engine thermally coupled to at least one coolant circuit through which circulates a coolant with a maximum coolant temperature,
the coolant circuit thermally coupled or at least temporarily thermally coupled via at least one heat exchanger to a latent heat accumulator,
the latent heat accumulator has a latent heat accumulator medium with a phase transition temperature that is higher than the maximum coolant temperature,
the latent heat accumulator medium is disposed in a vessel of the latent heat accumulator,
the vessel is movable in relation to the at least one heat exchanger,
the vessel and the heat exchanger are moveable into at least two different relative positions in which the transfer of heat from the latent heat accumulator medium to the coolant in the coolant circuit varies.

2. The assembly as in claim 1, wherein the latent heat accumulator medium is aluminum, which melts at the level of the phase transition temperature as heat is input into the accumulator or returns to a solid state as heat is discharged.

3. The assembly as in claim 1, wherein the relative position of the vessel and the heat exchanger is continuously adjustable such that the heat transfer is continuously settable to any value within a range of values.

4. The assembly as in claim 1, wherein a wall of the vessel has at least one first area with relatively high heat conductivity and at least one second area with relatively low heat conductivity, wherein an outer shell of the latent heat accumulator surrounding the wall has at least one first zone for transferring heat to the coolant and at least one second zone that insulates the vessel against heat losses, and wherein the at least two different relative positions are settable by moving the vessel such that, in a first relative position, a heat flux flows via the first area and the first zone from the latent heat accumulator medium to the coolant and such that, in a second relative position, a weaker heat flux flows via the first zone from the latent heat accumulator medium to the coolant.

5. The assembly as in claim 4, wherein the at least two different relative positions are settable by turning the vessel about a rotation axis such that, in a first rotary position, a heat flux flows via the first area and the first zone from the latent heat accumulator medium to the coolant and such that, in a second rotary position, a weaker heat flux flows via the first zone from the latent heat accumulator medium to the coolant.

6. The assembly as in claim 1, wherein the vessel is an inner vessel movably disposed inside an outer vessel, wherein a fluid is present in a partial area between the inner vessel and an outer wall of the outer vessel, such that the fluid, as the inner vessel moves in a first direction, is forced by the inner vessel into at least one hollow space between the inner vessel and the outer wall of the outer vessel such that the fluid improves the flow of heat to the coolant via the now at least partially filled hollow space.

7. A vehicle with an assembly as in claim 1, wherein the internal combustion engine is part of the assembly and configured to provide traction to the vehicle while in operation.

8. A method for preheating an internal combustion engine, the method comprising:
before the internal combustion engine is started, heating said internal combustion engine by heating coolant in at least one coolant circuit through which is flowing a coolant with a maximum coolant temperature,
heating the coolant in the coolant circuit with heat from a latent heat accumulator,
wherein the latent heat accumulator has, in a vessel, a latent heat accumulator medium that yields heat to the coolant at a phase transition temperature that is higher than the maximum coolant temperature, and
for controlling the intensity of the flow of heat from the latent heat accumulator medium to the coolant, moving the vessel in relation to the coolant circuit such that the heat transfer changes due to different relative positions of the vessel and the coolant circuit.

9. The method as in claim 8, wherein the latent heat accumulator medium is aluminum, which melts at the level of the phase transition temperature as heat is input into the accumulator or returns to a solid state as heat is discharged.

10. The assembly as in claim 1, wherein the latent heat accumulator is configured to be charged at least one of electrically and by electromagnetic fields.

11. The assembly as in claim 1, wherein the inner vessel comprises at least one heating resistor configured to charge the latent heat accumulator.

12. The method as in claim 8, further comprising charging the latent heat accumulator at least one of electrically and by electromagnetic fields.

13. The method as in claim 8, further comprising charging the latent heat accumulator with at least one heating resistor.

* * * * *